United States Patent [19]

Harvey

[11] 4,221,479
[45] Sep. 9, 1980

[54] CAMERA FILM MAGAZINE

[75] Inventor: Donald M. Harvey, Webster, N.Y.

[73] Assignee: Eastman Kodak Company, Rochester, N.Y.

[21] Appl. No.: 14,668

[22] Filed: Feb. 23, 1979

[51] Int. Cl.³ .......................................... G03B 17/26
[52] U.S. Cl. ................................... 354/275; 242/71.1
[58] Field of Search ................ 354/275; 206/53–54, 206/403–406; 242/71, 71.1–71.7

[56] References Cited

U.S. PATENT DOCUMENTS

| 2,731,894 | 1/1956 | Leitz et al. | 354/275 |
| 4,154,341 | 5/1979 | Osanai | 206/405 |

FOREIGN PATENT DOCUMENTS

| 1451239 | 9/1976 | United Kingdom | 354/275 |
| 316185 | of 1977 | U.S.S.R. | 354/275 |

Primary Examiner—L. T. Hix
Assistant Examiner—Shelley Wade
Attorney, Agent, or Firm—M. S. Sales

[57] ABSTRACT

A film magazine contains a roll of film wound on a core with a journal rotatable in a split bearing. The journal and the bearing have complementary, non-circular cross-sectional surfaces which inhibit unwinding rotation of the core until the bearing halves are separated by insertion into a camera.

10 Claims, 7 Drawing Figures

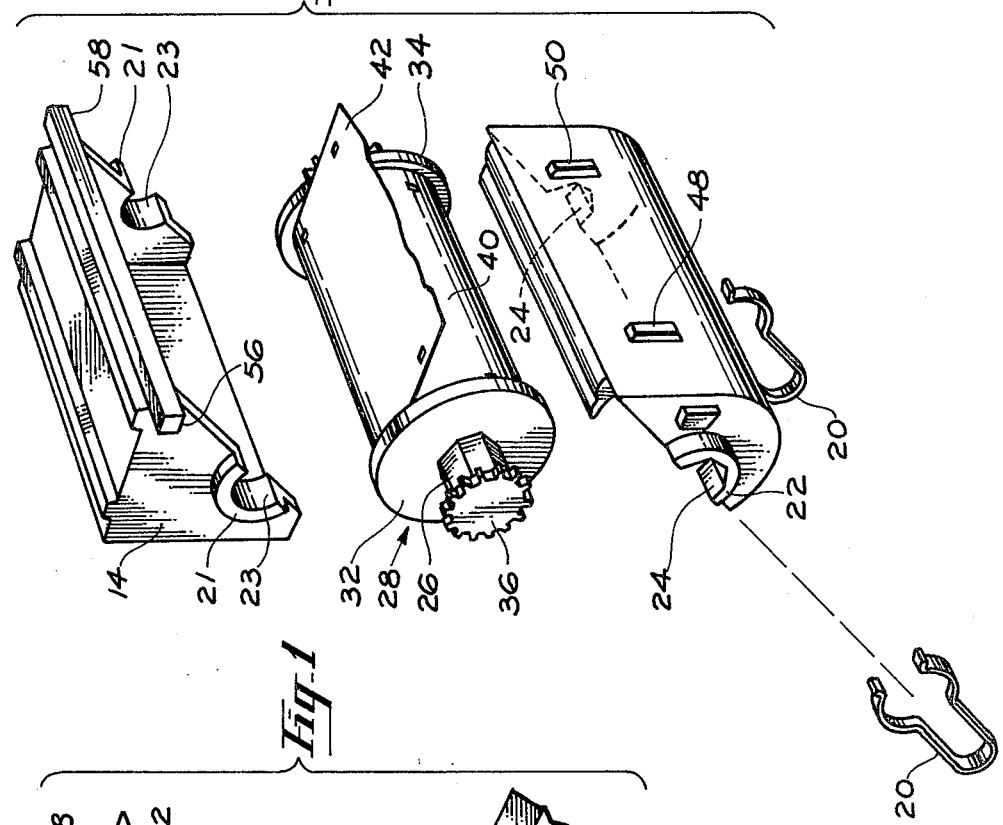
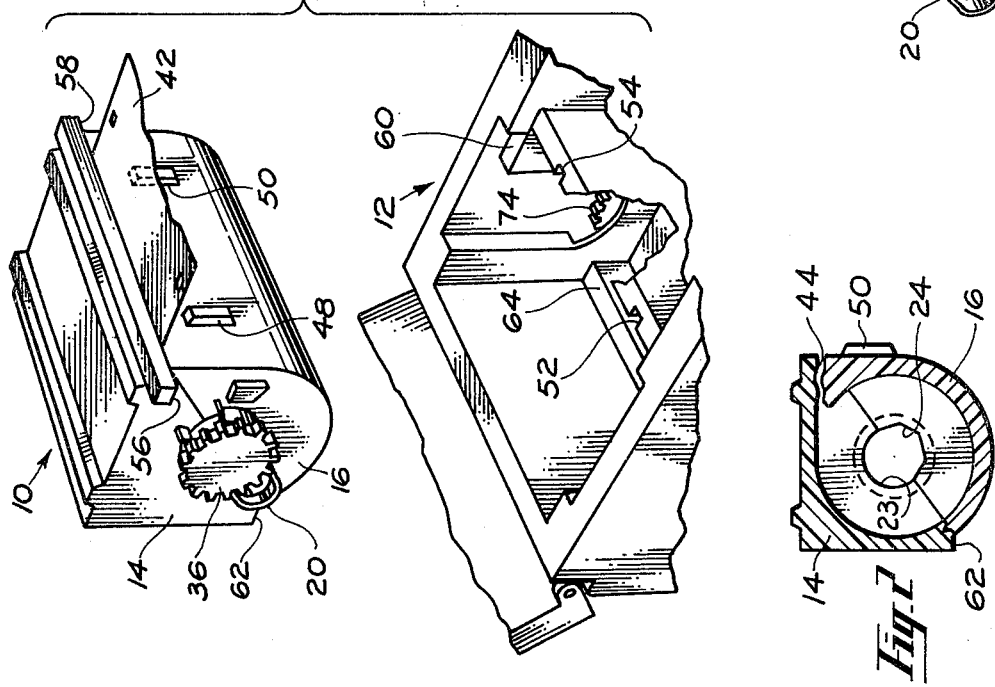

CAMERA FILM MAGAZINE

BACKGROUND OF THE INVENTION

1. Field of the Invention

The present invention relates to film magazines, and more particularly, to improvements in such magazines for reducing the force required to initiate the unwinding of film from a film supply roll wound within the magazine.

2. Description of the Prior Art

In film magazines of the general type to which the present invention relates, a film supply roll is wound on a core rotatably supported in a film supply compartment. When initially wound on the core, the inherent resiliency of the film tends to cause the film to try to return to a straight configuration, and when the magazine is subjected to shock and vibration, the film tends to straighten within the magazine. This causes the film convolutions to expand, commonly referred to as clock-springing, until the outermost convolution is in intimate frictional contact with the magazine's inner wall surface.

The frictional engagement of the film against the magazine's walls resists initial unwinding rotation of the roll when a camera's film transport mechanism applied tension to the leading end of the film. The resistance is reduced when sufficient film has been unwound to relieve the friction, whereupon the remainder of the film can be unwound by the application of considerably less film tension.

Previously known cameras employing film magazines with which the above-described phenomenon is encountered have been adapted to overcome the initially high resistance of the film to unwinding simply by the application of sufficient film tension to overcome the frictional engagement between the magazine's walls and the periphery of the supply roll. However, this approach to the problem entails the possibility of tearing or otherwise damaging the film through the application of excessive tension. Also, a camera incorporating such a relatively powerful film transport mechanism must be provided with a correspondingly strong metering system capable of intermittently inhibiting movement of the transport mechanism as successive film exposure areas are advanced into exposure position. Futhermore, and perhaps most importantly, in a camera provided with a film transport mechanism powered by an electric or spring-actuated motor, the extra torque required to initiate the film transport operation dictates that the drive motor be correspondingly larger and more powerful than is necessary to transport the film after the initial unwinding resistance has been overcome.

The problem is somewhat alleviated if after spooling, the loaded magazines with tightly wound film rolls are allowed to sit without being subjected to shocks and vibrations. As the film ages, its inherent plasticity causes it to set, and its clock-springing tendency diminishes. However, there remains some risk that subsequent jarring during shipping and handling will cause the film convolutions to expand and the outermost convolution to frictionally engage the magazine walls.

SUMMARY OF THE INVENTION

In order to reduce the problem of high initial resistance to film advance associated with roll clock-springing, releasable apparatus according to the present invention is employed to inhibit rotation of the core after spooling and before the magazine is loaded into a camera. Since the resiliency tending to expand the film convolutions will substantially disappear by the time that the customer loads the magazine into a camera and releases the rotation inhibiting apparatus, there will be little risk of clock-springing.

In accordance with a preferred embodiment of the invention, two casing members are assembled so as to form a film magazine in which a roll of film wound on a core is supported. When closed, the casing members clamp the core to prevent both its rotation and the clock-springing of the film wound thereon. Once inserted in a camera, the casing members are openable to allow free rotation of the core as the film is withdrawn from the magazine and transported across the camera's exposure position.

In the illustrated embodiment, which is presently preferred, the film core has polygon-shaped journals, and one of the magazine casing members has a complementary-shaped bearing surface. The leading end of the filmstrip is held in the magazine's film exit passageway to prevent it from being drawn into the supply chamber.

The invention, and its objects and advantages, will beome more apparent in the detailed description of the preferred embodiment presented below.

BRIEF DESCRIPTION OF THE DRAWINGS

In the detailed description of the preferred embodiments of the invention presented below, reference is made to the accompanying drawings in which:

FIG. 2 is a sectional view through the casing of the magazine shown in FIG. 1;

FIG. 3 is an exploded perspective view of the magazine shown in FIG. 1;

FIG. 7 is a view similar to FIG. 6 with the camera's film loading door closed.

DESCRIPTION OF THE PREFERRED EMBODIMENT

Figure 1:
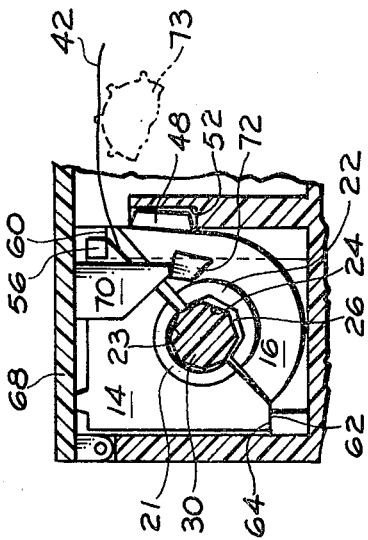
FIG. 1 is a perspective view of a film magazine in accordance with the present invention, together with a portion of a camera adapted to recieve the magazine.

Referring to FIG. 1, a film magazine 10 in accordance to a preferred embodiment of the present invention is illustrated aligned with the film supply chamber of a camera 12 adapted to receive the magazine. The magazine has two casing members 14 and 16 which are shown in assembled cross-section in FIG. 2. The casing members are assembled to form a generally cylindrical film chamber within the magazine.

Two spring clips 20 (FIG. 3) snap over collar halves 21 and 22 on each end of magazine 10 to resiliently hold the two casing members together. Collar halves 21 and 22 have smooth and polygon-shaped bearing surfaces 23 and 24, respectively, for receiving polygon-shaped journals 26 at the ends of a film reel 28.

Figure 4:
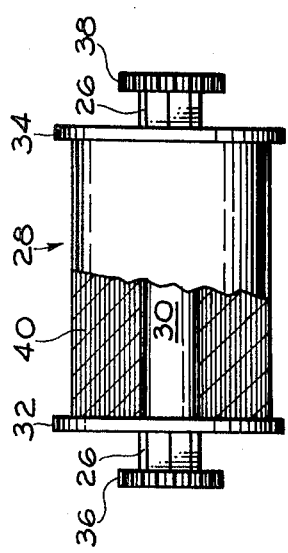
FIG. 4 is a side elevational view of a filmstrip wound on a flanged core for the magazine shown in FIG. 1.

Reel 28 is shown in FIG. 4, and includes a core 30, a pair of flanges 32 and 34, journals 26, and a pair of rewind gears 36 and 38. A filmstrip 40 is wound on reel 28, and the reel and filmstrip are housed in magazine 10 with a short leader section 42 of the filmstrip extending through a labyrinth-shaped passageway 44 formed between a pair of lips on the magazine, as shown in FIG. 1.

The lips forming passageway 44 are closed upon film leader section 42 by spring clips 20 to provide a light-tight passageway into the magazine's film chamber. The clamping pressure is sufficient to prevent the film leader section from being pulled into the chamber by the clock-springing tendency of the film.

Figure 5:
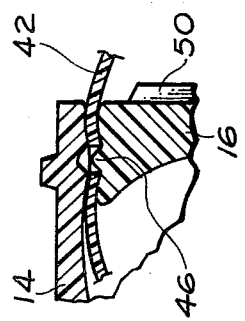
FIG. 5 is a fragmental sectional view of an alternative embodiment of the film magazine in accordance with the present invention.

FIG. 5 shows an alternative embodiment of the passageway wherein a tooth 46 is positioned on the lower side of the passageway to extend through a film perforation when the magazine is closed. This provides positive protection against movement of the film leader into or out of the magazine through the passageway until the casing members are opened.

Reel 28 is placed in open casing members 14 and 16 with filmstrip 40 tightly wound on the reel's core 30 within flanges 32 and 34. Leader section 42 extends from the magazine through passageway 44. The magazine is then closed and resiliently held together by spring clips 20.

When the magazine is closed, rotation of reel 28 is inhibited because of the polygonal shape of bearing surfaces 24 and journal halves 26. Movement of leader section 42 of the filmstrip into the magazine is inhibited by the clamping pressure at passageway 44. Accordingly, the filmstrip will remain tightly wound on core 30 without clock-springing.

Referring again to FIG. 1, two ribs 48 and 50 on magazine 10 align with corresponding notches 52 and 54, respectively, in the wall of the camera's supply chamber. If the operator attempts to load the magazine with film leader portion 42 wrapped around the magazine, ribs 48 and 50 will be covered by the leader and will not fit into their corresponding notches.

Figure 6:
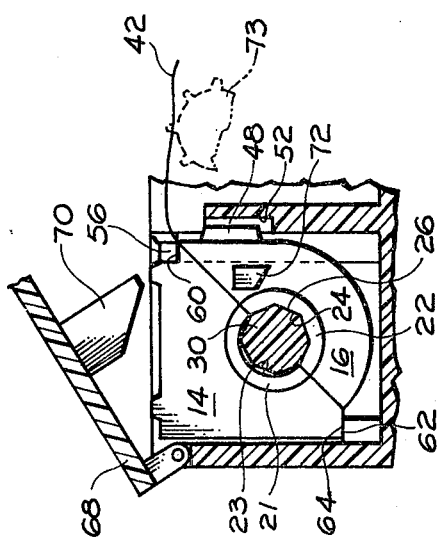
FIG. 6 shows the magazine of FIG. 1 received in a camera with the camera's film loading door open.

Proper insertion of the magazine is illustrated in FIGS. 6 and 7. Upper casing member 14 has two tabs 56 and 58 which extend axially of the magazine's cylindrical shape to be received onto a pair of camera shoulders 60, one of which is shown in FIG. 1. A flat surface 62 is diagonally opposite tabs 56 and 58 on casing member 14 and seats against another shoulder 64 in the camera's supply chamber. Thus, when the magazine is dropped into the supply chamber, it is suspended by tabs 56 and 58 and by surface 62.

Camera film compartment door 68 has a pin 70 which aligns with a block 72 on lower casing member 16. As the door is closed, pin 70 engages the block and forces the magazine open against the resilient force of spring clips 20. The film resiliency tending to expand the film convolutions will substantially disappear within fifty days (based on a 50% relative humidity). By the time that the customer loads the magazine into a camera and releases the rotation inhibiting apparatus, there will be little risk of clock-springing.

With the magazine open, as shown in FIG. 7, core 30 is free to rotate because polygonal-shaped bearing surface halves 24 have been moved away from journals 26 of the core. Filmstrip leader portion 42 is no longer clamped in film exit passageway 44, and the film may be transported through the camera's exposure position by, for example, a film drive sprocket 73.

After the last exposure, the film may be rewound into the cartridge by a camera drive gear 74 which is positioned to mesh with one of the magazine's rewind gears 36. Following the rewind operation, film compartment door 68 may be opened to remove the magazine for processing. As the door opens, spring clip 20 recloses the magazine to insure light-tightness.

The invention has been described in detail with particular reference to a preferred embodiment thereof, but it will be understood that variations and modifications can be effected within the spirit and scope of the invention.

What is claimed is:

1. In a partially openable film magazine insertable into photographic apparatus and having a film supply chamber, a core in the chamber for receiving a wound filmstrip, and a passageway through which the filmstrip can be lead from within the chamber as the core rotates in an unwinding direction; the improvement comprising:
   releasable means for inhibiting filmstrip unwinding rotation of the core when the magazine is closed; and
   means associated with said inhibiting means for releasing said inhibiting means when the film magazine is partially opened, whereupon unwinding rotation can be imparted to the core to move film through the passageway.

2. In a film magazine insertable into photographic apparatus and having a film supply chamber, a core in the chamber for receiving a wound filmstrip, and a passageway through which the filmstrip can be lead from within the chamber as the core rotates in an unwinding direction; the improvement comprising:
   releasable means for inhibiting filmstrip unwinding rotation of the core;
   means associated with said inhibiting means for releasing said inhibiting means when the film magazine is inserted into photographic apparatus, whereupon unwinding rotation can be imparted to the core to move film through the passageway;
   releasable means for clamping the filmstrip to restrain movement of the filmstrip through the passageway; and
   means associated with said clamping means for releasing said clamping means when the magazine is inserted into photographic apparatus, whereby the filmstrip may be moved through the passageway.

3. The improvement as defined by claim 2 wherein said clamping means comprises a pair of spring-urged lips which clamp the filmstrip therebetween and which are opened by said means for releasing said clamping means.

4. In an openable photographic film magazine receivable by a camera and including a film supply chamber, a core in the chamber for receiving a wound filmstrip, and a passageway through which the filmstrip can be lead from within the chamber to the camera's exposure position as the core rotates in an unwinding direction; the improvement comprising:
   releasable means in the magazine for inhibiting filmstrip unwinding rotation of the core when the magazine is closed; and
   means on the magazine which can be conditioned by the camera to open the magazine and release said inhibiting means to permit unwinding rotation of the core to unwind the filmstrip.

5. The improvement as defined in claim 4 further comprising:
   means for restraining movement of the filmstrip through the passageway; and means associated with said restraining means for releasing said restraining means when the magazine is inserted into photographic camera.

6. In a film magazine insertable into photographic apparatus and having a film supply chamber, a bearing, a core rotatable in the chamber on a journal in the bearing for receiving a wound filmstrip, and a passageway through which the filmstrip can be lead from within the chamber as the core rotates in an unwinding direction; the improvement wherein:

the bearing has a first condition normally inhibiting the unwinding rotation of the core and a second condition permitting such rotation; and means for placing the bearing in its second condition when the magazine is inserted into photographic apparatus.

7. In a film magazine insertable into photographic apparatus and having a film supply chamber, a split bearing, resilient means urging the bearing closed, a core rotatable in the chamber on a journal in the bearing for receiving a wound filmstrip, and a passageway through which the filmstrip can be lead from within the chamber as the core rotates in an unwinding direction; the improvement comprising:

means associated with the split bearing and the journal for inhibiting unwinding rotation of the core when the bearing is closed; and means for opening the bearing to permit rotation of the core when the magazine is inserted into photographic apparatus.

8. The improvement as defined in claim 7 wherein the bearing and the journal have complementary, non-circular cross-sectional surfaces.

9. The improvement as defined in claim 7 wherein the bearing and the journal have complementary, polygonal cross-sectional surfaces.

10. In a film magazine insertable into photographic apparatus and having two openable casing members enclosing a film chamber and forming at least one bearing with a portion of the bearing surface on each casing member, resilient means urging the casing members closed, a core rotatable in the chamber on a journal in the bearing for receiving a wound filmstrip, and a passageway through which the filmstrip can be lead from within the chamber as the core rotates in an unwinding direction; the improvement comprising:

means associated with the bearing and the journal for inhibiting unwinding rotation of the core when the casing members are closed; and means for opening the casing members to permit rotation of the core when the magazine is inserted into photographic apparatus.

* * * * *